United States Patent
Seo et al.

(10) Patent No.: US 8,973,929 B1
(45) Date of Patent: Mar. 10, 2015

(54) CASTER ACTIVE GEOMETRY CONTROL SYSTEM

(71) Applicant: Hyundai Motor Company, Seoul (KR)

(72) Inventors: In Seok Seo, Seoul (KR); Sung Jun Kim, Hwaseong-si (KR); Daewon Jang, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/143,531

(22) Filed: Dec. 30, 2013

(30) Foreign Application Priority Data

Aug. 20, 2013 (KR) ........................ 10-2013-0098343

(51) Int. Cl.
*B62D 17/00* (2006.01)

(52) U.S. Cl.
USPC .................................................. 280/86.752

(58) Field of Classification Search
CPC ................... B60G 2200/462; B60G 2200/464; B60G 2200/46; B60G 15/068; B62D 17/00
USPC ............. 280/86.75, 86.751, 86.752, 124.145, 280/124.146, 124.147, 124.154, 124.155
See application file for complete search history.

(56) References Cited

U.S. PATENT DOCUMENTS

| | | | | |
|---|---|---|---|---|
| 3,526,413 A | * | 9/1970 | Muller ..................... | 280/86.756 |
| 6,485,223 B1 | * | 11/2002 | Van Schmus et al. ..... | 403/408.1 |
| 6,676,142 B2 | * | 1/2004 | Allman et al. ........... | 280/86.751 |
| 7,513,514 B1 | * | 4/2009 | Schlosser et al. ........ | 280/93.511 |
| 7,607,668 B2 | * | 10/2009 | Dugandzic et al. ...... | 280/86.752 |
| 7,850,183 B1 | * | 12/2010 | Ryshavy et al. ........ | 280/124.147 |
| 8,820,759 B1 | * | 9/2014 | Croutcher ................ | 280/86.752 |
| 2012/0242055 A1 | * | 9/2012 | Starck et al. ........... | 280/124.145 |

FOREIGN PATENT DOCUMENTS

| | | |
|---|---|---|
| JP | 2949986 B2 | 7/1999 |
| JP | 4653514 B2 | 3/2011 |
| KR | 10-0394631 B1 | 8/2003 |
| KR | 10-2011-0027227 A | 3/2011 |

* cited by examiner

*Primary Examiner* — Faye M. Fleming
(74) *Attorney, Agent, or Firm* — Morgan, Lewis & Bockius LLP

(57) ABSTRACT

A caster active control system that is mounted on a suspension including a strut assembly for automatically adjusting a cater angle of a wheel of a vehicle, may include a fixed frame that is fixed to a vehicle body, a movable frame slidably mounted on a bottom of the fixed frame and configured to reciprocate in a front-rear direction of the wheel, a strut mount unit fixed to the movable frame and connected with an upper end of the strut assembly, and an operation module disposed between the fixed frame and the movable frame and engaged with the movable frame, wherein the operation module is driven by a motor to move the movable frame in the front-rear direction of the wheel.

11 Claims, 7 Drawing Sheets

CASTER ACTIVE GEOMETRY CONTROL SYSTEM

CROSS-REFERENCE TO RELATED APPLICATION

The present application claims priority to Korean Patent Application No. 10-2013-0098343 filed on Aug. 20, 2013, the entire contents of which is incorporated herein for all purposes by this reference.

BACKGROUND OF THE INVENTION

1. Field of the Invention

An exemplary embodiment of the present invention relates to a suspension system of a vehicle. More particularly, the present invention relates to a caster active control system of a vehicle for automatically adjusting a cast angle of a wheel.

2. Description of Related Art

In general, the front wheels of a vehicle include a camber, a caster, a king-pin, and a toe-in, which mean geometric angles, in consideration of driving performance, stability, and adjustability.

In this case, in a suspension using a strut, the straight line connecting the upper end of a strut assembly and the ball joint of a lower arm is called a king-pin axis and the angle made by an extension line from the king-pin axis and the center line of the wheel is called a caster angle.

The caster angle, which has an important effect on traveling of a vehicle, for example, provides directionality to a wheel in traveling and provides a return force that returns the wheel in the direct forward direction in steering.

In the suspension using a suspension, a strut assembly may be mounted with the upper end fixed to the vehicle body through a mount bracket and the lower end fixed to a knuckle of a wheel. Accordingly, the caster angle of a wheel can be adjusted by adjusting the angle made by the center line of the strut assembly and the vertical line.

In the related art, however, there is no system that can automatically adjust the caster angle of a vehicle, such that the caster angle of a wheel has to be manually adjusted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a caster active control system connected with a strut assembly between a vehicle body and the strut assembly and having advantages of being able to automatically control a caster angle of a wheel.

In an aspect of the present invention, a caster active control system that is mounted on a suspension including a strut assembly for automatically adjusting a cater angle of a wheel of a vehicle, may include a fixed frame that is fixed to a vehicle body, a movable frame slidably mounted on a bottom of the fixed frame and configured to reciprocate in a front-rear direction of the wheel, a strut mount unit fixed to the movable frame and connected with an upper end of the strut assembly, and an operation module disposed between the fixed frame and the movable frame and engaged with the movable frame, wherein the operation module is driven by a motor to move the movable frame in the front-rear direction of the wheel.

The movable frame may include a mounting portion for mounting the strut mount unit.

A guide hole corresponding to displacement of the movable frame is formed at the fixed frame.

The movable frame may include a mounting portion protruding into the guide hole of the fixed frame, and the strut mount unit is mounted on the mounting portion.

The strut mount unit may include a mount bracket fixed to the mounting portion, a coupling portion disposed at the mount bracket and coupled to the upper end of the strut assembly, and an insulator integrally formed with the mount bracket.

A coupling hole where the upper end of the strut assembly is fitted is formed at the coupling portion.

The insulator may include a support bracket integrally connected to thee mount bracket through a shock absorbing member.

The operation module may include a drive motor fixed to a side of the fixed frame, a Linear Motion (LM) guide connected to the drive motor, disposed on the fixed frame, and connected with the movable frame, and a pair of sliders disposed on the fixed frame and connected with the movable frame.

The LM guide may include a first guide rail fixed in the front-rear direction of the wheel, at the fixed frame, a lead screw connected with the drive motor and disposed along the first guide rail, and a movable block thread-fastened to the lead screw, slidably mounted on the first guide rail, and connected with the movable frame.

A guide hole corresponding to displacement of the movable frame is formed at the fixed frame, and the pair of sliders is disposed on the fixed frame with the guide hole therebetween.

Each of the sliders may include a second guide rail fixed in the front-rear direction of the wheel, at the fixed frame, and a sliding block slidably mounted on the second guide rail and connected with the movable frame.

According to exemplary embodiments of the present invention, it is possible to automatically adjust the caster angle of a wheel by moving the strut assembly coupled to the strut mount of the movable frame, using the operation module.

Therefore, in an exemplary embodiment of the present invention, it is possible to improve high-speed straight movement ability, driving safety, and turning ability of a vehicle by automatically adjusting the cater angle of the wheel when the vehicle travels straight at a high speed or turns, it is possible to optimize a steering force and an assist force, and it is possible to considerably improve nose-down in sudden braking.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
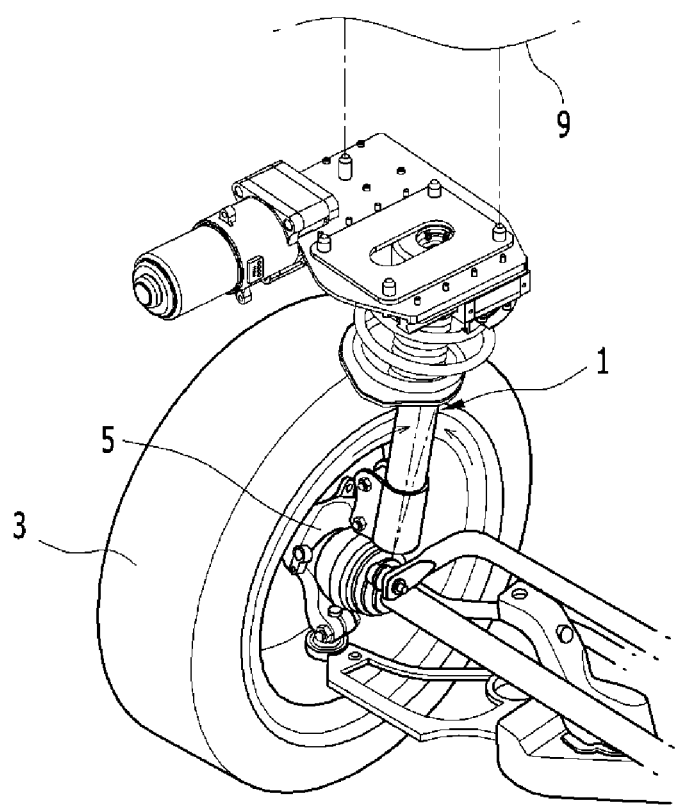
FIG. 1 is a perspective view showing the mounting structure of a caster active control system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Further, the sizes and thicknesses of the configurations shown in the drawings are provided selectively for the convenience of description, so that the present invention is not limited to those shown in the drawings and the thicknesses are exaggerated to make some parts and regions clear.

Discriminating the names of components with the first, the second, etc. in the following description is for discriminating them for the same relationship of the components and the components are not limited to the order in the following description.

Throughout the specification, unless explicitly described to the contrary, the word "comprise" and variations such as "comprises" or "comprising", will be understood to imply the inclusion of stated elements but not the exclusion of any other elements.

Further, the terms, " . . . unit", " . . . mechanism", " . . . portion", " . . . member" etc. used herein mean the unit of inclusive components performing at least one or more functions or operations.

FIG. 1 is a perspective view showing the mounting structure of a caster active control system according to an exemplary embodiment of the present invention.

Referring to FIG. 1, a caster active control system 100 according to an exemplary embodiment of the present invention can be used for a suspension including a strut assembly 1, as a front wheel suspension of a vehicle.

For example, the strut assembly 1 of a front wheel suspension connects a knuckle 5 of a wheel 3 and a vehicle body 9, includes a shock absorber and a spring, and absorbs and attenuates a shock applied through the wheel 3.

The front wheel suspension and the strut assembly 1 have the basic configurations of front wheel suspensions well known in the art, such that the configuration is not described in detail herein.

The caster active control system 100 according to an exemplary embodiment of the present invention, which is used for a front suspension, as described above, has a structure connected with the strut assembly 1 between the vehicle body 9 and the strut assembly 1 and being able to automatically adjust the caster angle of the wheel 3.

Figure 2:
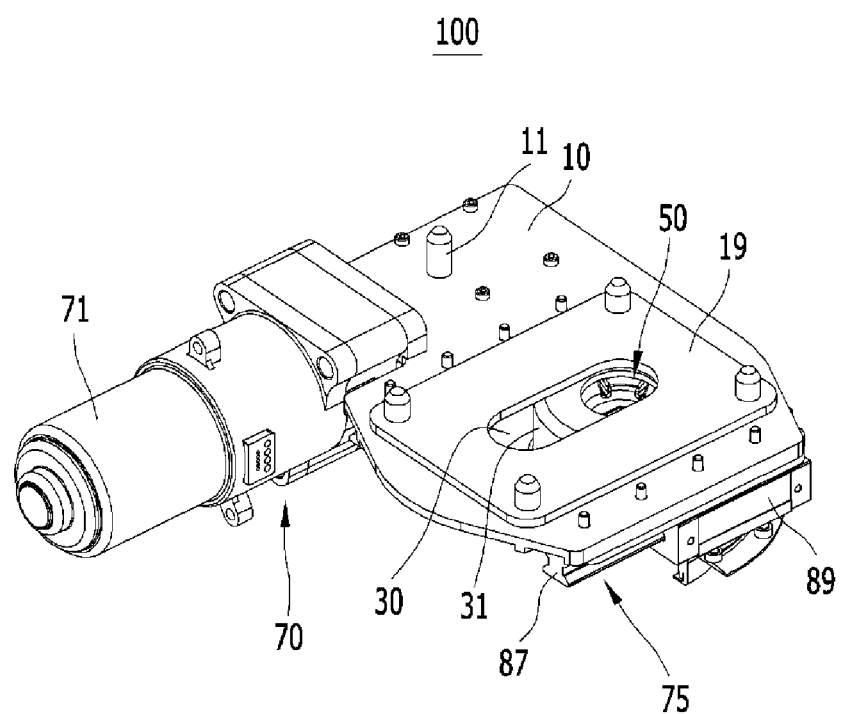
FIGS. 2 and 3 are perspective views showing the caster active control system according to an exemplary embodiment of the present invention.
Figure 3:
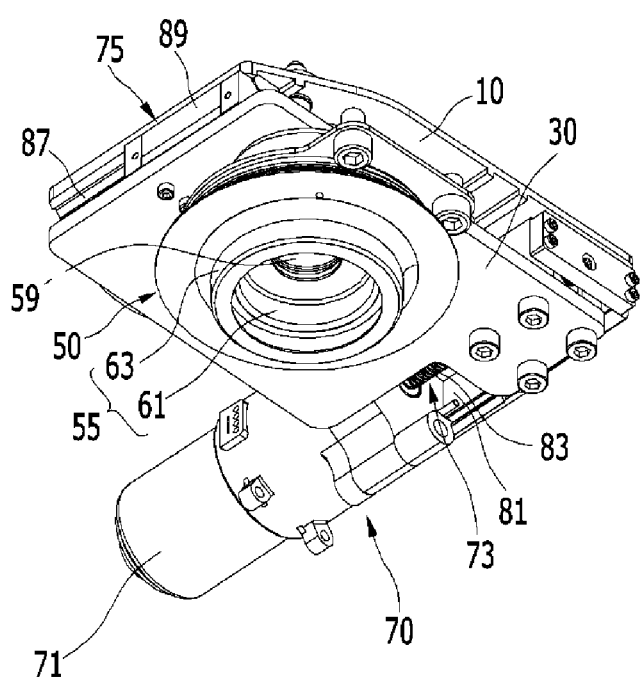
Figure 4:
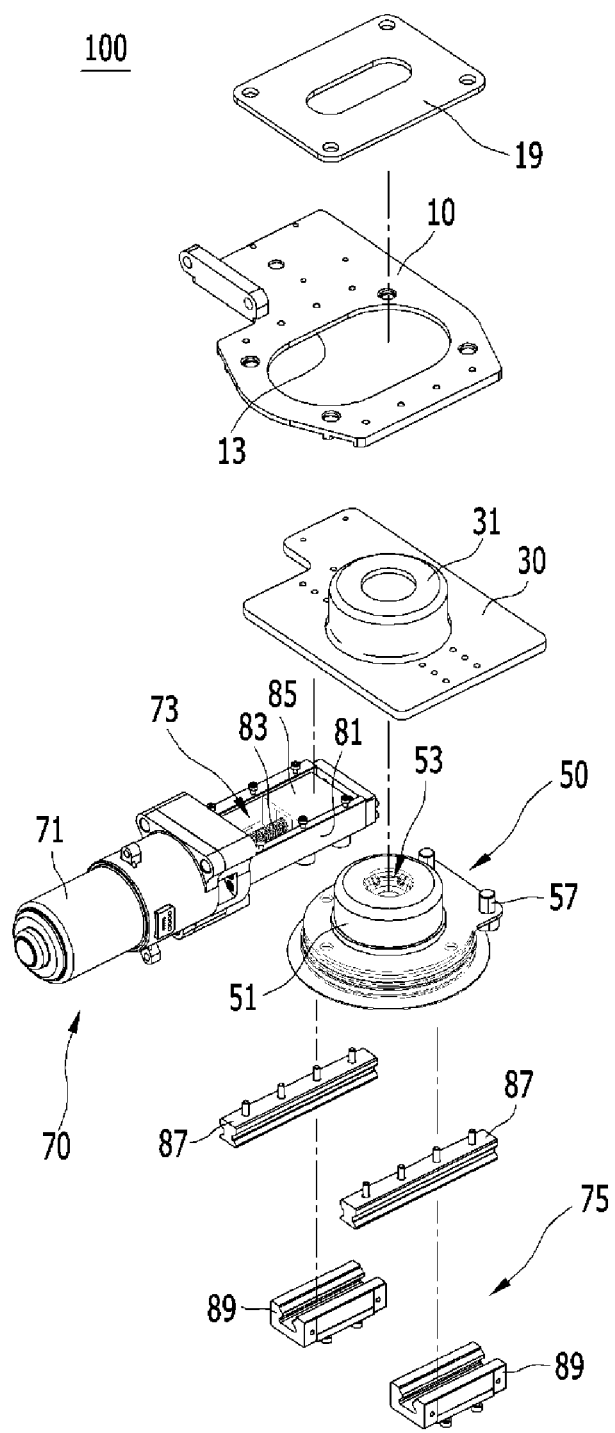
FIG. 4 is an exploded perspective view showing the caster active control system according to an exemplary embodiment of the present invention.

FIGS. 2 and 3 are perspective views showing the caster active control system according to an exemplary embodiment of the present invention and FIG. 4 is an exploded perspective view showing the caster active control system according to an exemplary embodiment of the present invention.

Referring to FIGS. 2 to 4, the caster active control unit 100 according to an exemplary embodiment of the present invention includes basically a fixed frame 10, a movable frame 30, a strut mount unit 50, and an operation module 70.

The fixed frame 10 is fixed to the vehicle body 9 (hereafter, see FIG. 1), corresponding to the upper end of the strut assembly 1 (hereafter, see FIG. 1). The fixed frame 10 may be fastened to the vehicle body 9 by bolts 11.

A guide hole 13 corresponding to displacement of the movable frame 30 to be described below is formed through the fixed frame 10. The guide hole 13 may be formed in an oblong in the front-rear direction of the wheel 3.

In the drawings, the reference numeral '19' indicates a cover plate coupled to the top of the fixed frame 10 and supporting the fixed frame 10 and the cover plate 19 may be fastened to the vehicle body 9, having a hole that opens a portion of the guide hole 13 of the fixed frame 10.

The movable frame 30 can reciprocate in the front-rear direction of the wheel 3, on the bottom of the fixed frame 10. The movable frame 30 can reciprocate in the front-rear direction of the wheel 3 (hereafter, see FIG. 1) by the operation module 70 to be described below.

A mounting portion 31 having a circular space protruding to the guide hole 13 of the fixed frame 10 is formed substantially at the center portion on the bottom of the movable frame 30. The strut mount unit 50 to be described below may be mounted in the circular space of the mounting portion 31.

The strut mount unit 50 connected to the upper end of the strut assembly 1 is fixed to the movable frame 30.

The strut mount 50 includes a mount bracket 51, a coupling portion 53, and an insulator 55. The mount bracket 51 is fixed to the mounting portion 31 of the movable frame 30. The mount bracket 51 is disposed in the circular space of the mounting portion 31 and may be fastened to the mounting portion 31 by bolts 57.

The coupling portion 53 coupled to the upper end of the strut assembly 1 is disposed on the mount bracket 51. A bush connected with the upper end of the strut assembly 1 is disposed at the coupling portion 53 and has a coupling hole 59 for coupling its upper end.

The insulator 55, which absorbs a shock transmitted to the vehicle body 9 from the strut assembly 1, may be formed integrally with the mount bracket 51. The insulator 55 includes a support bracket 63 integrally connected to the mount bracket 51 through a shock absorbing member 61 that is a damper. The shock absorbing member 61 may be vulcanized-bonded to the mount bracket 51 and the support bracket 63 between the brackets 51 and 53.

In an exemplary embodiment of the present invention, the operation module 70, which is driven by a motor to reciprocate the movable frame 30 in the front-rear direction of the wheel 3, is disposed between the fixed frame 10 and the movable frame 30. The operation module 70 includes a drive motor 71, a Linear Motion (LM) guide 73, and a pair of sliders 75.

The drive motor 71 is a servomotor having a common structure and fixed to a side of the fixed frame 10, and it may be operated by a control unit ECU. The drive motor 71 may be fixed to the edge of a side on the bottom of the fixed frame 10.

The LM guide 73, which converts the torque from the drive motor 71 into straight reciprocating motion, is connected to the drive motor 71, disposed at a side on the bottom of the fixed frame 10, and connected with the movable frame 30.

Figure 5:
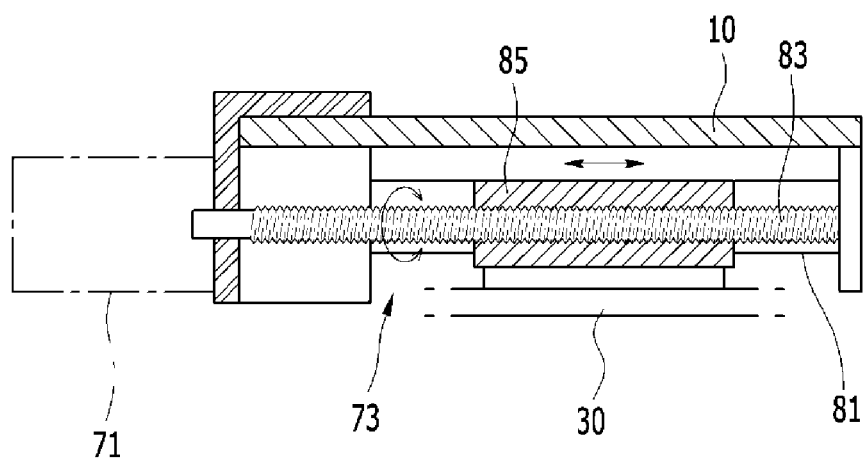
FIG. 5 is a cross-sectional view schematically showing the configuration of an operation module that is used in the caster active control system according to an exemplary embodiment of the present invention.

The LM guide 73 includes a first guide rail 81, a lead screw 83, and a movable block 85, as shown in FIG. 5. The first guide rail 81 is fixed in the front-rear direction of the wheel 3, at a side on the bottom of the fixed frame 10.

The lead screw 83 is connected to the drive shaft of the drive motor 71 and disposed along the first guide rail 81. The movable block 85 is thread-fastened to the lead screw 83, slidably fitted on the guide rail 81, and connected with a side of the movable frame 30.

Accordingly, in an exemplary embodiment of the present invention, as the drive motor 71 operates, the lead screw 83 is rotated by the drive motor 71 and the movable block 85 reciprocates along the first guide rail 81 in the front-rear direction of the wheel 3, such that the movable frame 30 can reciprocate in the front-rear direction of the wheel 3.

On the other hand, the pair of sliders 75 is disposed on the fixed frame 10 and connected to the movable frame 30. The sliders 75 have a function of guiding the movable frame reciprocated by the drive motor 71 in the front-rear direction of the wheel 3.

The sliders 75 are disposed at both sides, respectively, on the bottom of the fixed frame 10 with the guide hole 13 of the fixed frame 10 therebetween, and are fastened to the movable frame 30 by fasteners.

Figure 6:
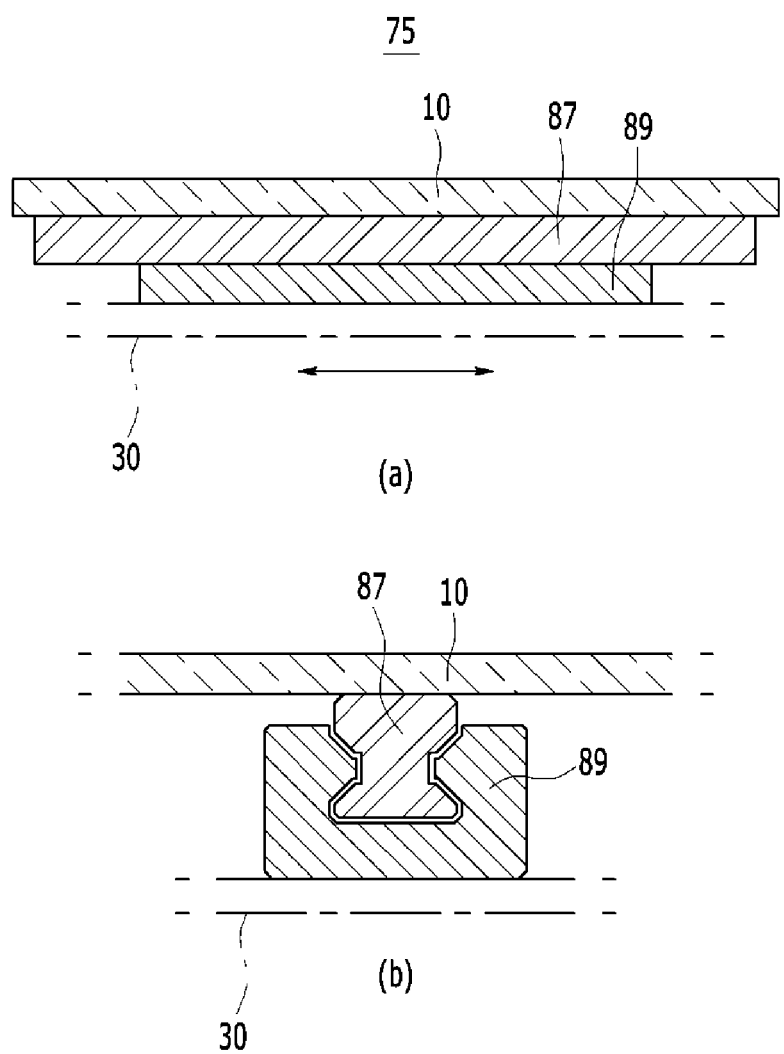
FIG. 6 is a cross-sectional view schematically showing the configuration of a slider that is used in the caster active control system according to an exemplary embodiment of the present invention.

The pair of sliders 75 each includes a second guide rail 87 and a sliding block 89, as shown in FIG. 6. The second guide rails 87 may be fixed in the front-rear direction of the wheel 3, at both sides on the bottom of the fixed frame 10. The sliding blocks 89 are slidably fitted on the second guide rails 87 and may be fastened to the movable frame 30 by fasteners.

Therefore, according to the caster active control system of an exemplary embodiment of the present invention which has the configuration described above, as in the figures stated above, the fixed frame 10 of the system 100 is mounted on the vehicle body 9 and the upper end of the strut assembly 1 is coupled to the coupling portion 53 of the strut mount unit 50 at the movable frame 30.

Figure 7:
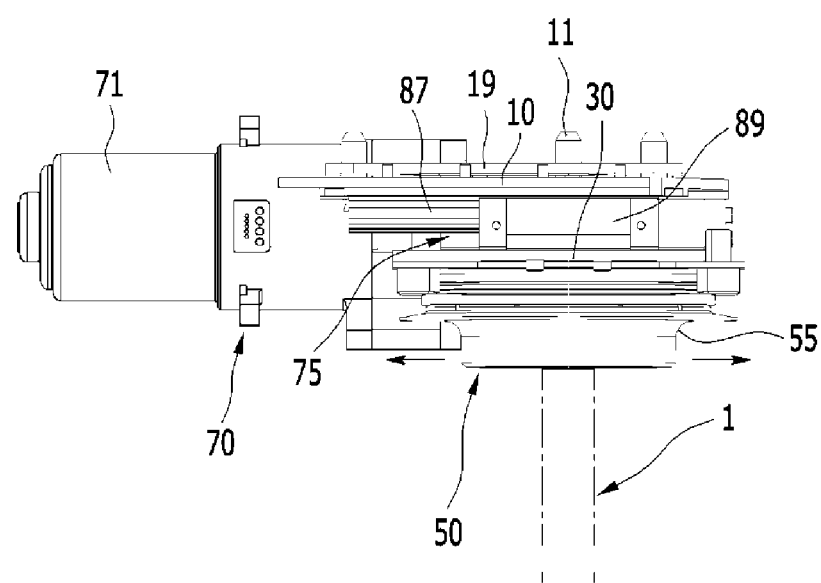
FIG. 7 is a view showing the operation of the caster active control system according to an exemplary embodiment of the present invention.

In this state, the drive motor 71 of the operation module 70 is operated, as shown in FIG. 7, in an exemplary embodiment of the present invention. Then, the lead screw 83 of the LM guide 73 is operated by the drive motor 71, and accordingly, the movable block 85 of the LM guide 73 moves in the front-rear direction of the wheel 3 along the first guide rail 81.

Since the movable frame 30 is connected to the movable block 85 of the LM guide 73 and to the pair of sliders 75, it can move the sliders 75 in the front-rear direction of the wheel 3 along the first guide rail 81.

Accordingly, as the movable frame 30 is moved in the front-rear direction of the wheel 3 by the operation module 70 in an exemplary embodiment of the present invention, the strut assembly 1 coupled to the strut mount unit 50 of the movable frame 30 can be moved in the front-rear direction of the wheel 3. That is, the strut assembly 1 can move in the front-rear direction of the wheel 3, with the knuckle 5 of the wheel 3 as a joint center.

Therefore, in an exemplary embodiment of the present invention, it is possible to implement positive (+) caster by inclining the upper portion of the strut assembly 1 to the rear of a vehicle, using the operation module 70, to implement zero (0) caster by aligning the center line of the strut assembly 1 and the vertical line, and to implement negative (−) caster by inclining the upper portion of the strut assembly 1 to the front of the vehicle.

As described above, according to the caster active control system of an exemplary embodiment of the present invention, it is possible to automatically adjust the cater angle of the wheel 3 by changing the position of the strut assembly 1, using the operation module 70.

Therefore, in an exemplary embodiment of the present invention, it is possible to improve high-speed straight movement ability, driving safety, and turning ability of a vehicle by automatically adjusting the cater angle of the wheel 3, when the vehicle travels straight at a high speed or turns, it is possible to optimize a steering force and an assist force, and it is possible to considerably improve nose-down in sudden braking.

Further, in an exemplary embodiment of the present invention, since it is possible to automatically adjust the caster angle of the wheel 3, it is possible to improve traveling performance of a vehicle by increasing a steering restoring force when the vehicle travels straight at a high speed, to improve anti-dive and lift characteristics in sudden braking and sudden starting, and to further improve limit turning ability due to an increase in camber angle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A caster active control system that is mounted on a suspension including a strut assembly for automatically adjusting a caster angle of a wheel of a vehicle, the system comprising:

a fixed frame that is fixed to a vehicle body;

a movable frame slidably mounted on a bottom of the fixed frame and configured to reciprocate in a front-rear direction of the wheel;

a strut mount unit fixed to the movable frame and connected with an upper end of the strut assembly; and an operation module disposed between the fixed frame and the movable frame and engaged with the movable frame, wherein the operation module is driven by a motor to move the movable frame in the front-rear direction of the wheel.

2. The system of claim 1, wherein the movable frame includes a mounting portion for mounting the strut mount unit.

3. The system of claim 1, wherein a guide hole corresponding to displacement of the movable frame is formed at the fixed frame.

4. The system of claim 3,
wherein the movable frame includes a mounting portion protruding into the guide hole of the fixed frame, and
wherein the strut mount unit is mounted on the mounting portion.

5. The system of claim 2, wherein the strut mount unit includes:
a mount bracket fixed to the mounting portion;
a coupling portion disposed at the mount bracket and coupled to the upper end of the strut assembly; and
an insulator integrally formed with the mount bracket.

6. The system of claim 5, wherein a coupling hole where the upper end of the strut assembly is fitted is formed at the coupling portion.

7. The system of claim 5, wherein the insulator includes a support bracket integrally connected to the mount bracket through a shock absorbing member.

8. The system of claim 1, wherein the operation module includes:
a drive motor fixed to a side of the fixed frame;
a Linear Motion (LM) guide connected to the drive motor, disposed on the fixed frame, and connected with the movable frame; and
a pair of sliders disposed on the fixed frame and connected with the movable frame.

9. The system of claim 8, wherein the LM guide includes:
a first guide rail fixed in the front-rear direction of the wheel, at the fixed frame;
a lead screw connected with the drive motor and disposed along the first guide rail; and
a movable block thread-fastened to the lead screw, slidably mounted on the first guide rail, and connected with the movable frame.

10. The system of claim 8,
wherein a guide hole corresponding to displacement of the movable frame is formed at the fixed frame, and
wherein the pair of sliders is disposed on the fixed frame with the guide hole therebetween.

11. The system of claim 8, wherein each of the sliders include:
a second guide rail fixed in the front-rear direction of the wheel, at the fixed frame; and
a sliding block slidably mounted on the second guide rail and connected with the movable frame.

* * * * *